US010921806B2

(12) United States Patent
Kim et al.

(10) Patent No.: US 10,921,806 B2
(45) Date of Patent: Feb. 16, 2021

(54) MOVING ROBOT

(71) Applicant: LG ELECTRONICS INC., Seoul (KR)

(72) Inventors: Hyunsung Kim, Seoul (KR); Jaewon Song, Seoul (KR)

(73) Assignee: LG ELECTRONICS INC., Seoul (KR)

(*) Notice: Subject to any disclaimer, the term of this patent is extended or adjusted under 35 U.S.C. 154(b) by 441 days.

(21) Appl. No.: 15/872,629

(22) Filed: Jan. 16, 2018

(65) Prior Publication Data

US 2018/0203448 A1 Jul. 19, 2018

(30) Foreign Application Priority Data

Jan. 16, 2017 (KR) .................. 10-2017-0007216

(51) Int. Cl.
G05D 1/00 (2006.01)
G05D 1/02 (2020.01)
(Continued)

(52) U.S. Cl.
CPC .......... G05D 1/0088 (2013.01); A47L 9/2805 (2013.01); G01B 11/14 (2013.01);
(Continued)

(58) Field of Classification Search
CPC .. G05D 1/0234; G05D 1/0246; G05D 1/0274; G05D 2201/023; G05D 21/005;
(Continued)

(56) References Cited

U.S. PATENT DOCUMENTS 4,933,864 A * 6/1990 Evans, Jr. ................ G01S 5/16
180/167
6,807,478 B2 * 10/2004 Giannopoulos ........... G01S 1/70
701/434

(Continued)

FOREIGN PATENT DOCUMENTS

EP 1 437 636 7/2004
EP 2 161 537 3/2010
(Continued)

OTHER PUBLICATIONS

Korean Office Action dated Aug. 14, 2018 issued in Application No. 10-2017-0007216.
(Continued)

Primary Examiner — Thomas G Black
Assistant Examiner — Sara J Lewandroski
(74) Attorney, Agent, or Firm — Ked & Associates, LLP

(57) ABSTRACT

A moving robot is provided. A moving robot according to an embodiment of the present invention determines the location of a preset light device within a driving area and controls the light device based on the location. A moving robot according to an embodiment of the present invention includes a control unit controlling on/off of a light device through a communication unit and determining the location of a light device while moving a main body to a location where illuminance is changed based on an image obtained by an image acquisition unit.

18 Claims, 11 Drawing Sheets

(51) Int. Cl.

| | | |
|---|---|---|
| *G05D 25/02* | (2006.01) | |
| *G01B 11/14* | (2006.01) | |
| *A47L 9/28* | (2006.01) | |
| *G06K 9/00* | (2006.01) | |
| *H05B 47/11* | (2020.01) | |
| *H05B 47/105* | (2020.01) | |

(52) U.S. Cl.
CPC ......... *G05D 1/0221* (2013.01); *G05D 1/0225* (2013.01); *G05D 1/0234* (2013.01); *G05D 1/0238* (2013.01); *G05D 1/0246* (2013.01); *G05D 1/0274* (2013.01); *G05D 25/02* (2013.01); *G06K 9/00671* (2013.01); *H05B 47/105* (2020.01); *H05B 47/11* (2020.01); *G05D 2201/0203* (2013.01); *G05D 2201/0215* (2013.01); *Y02B 20/40* (2013.01); *Y10S 901/01* (2013.01); *Y10S 901/47* (2013.01)

(58) Field of Classification Search
CPC .. G05D 21/20; G05D 21/206; G05D 21/3644; G05D 25/02; H05B 47/10; H05B 47/105; H05B 47/11; H05B 47/155; H05B 47/16; H05B 47/165; H05B 47/175; H05B 47/19
See application file for complete search history.

(56) References Cited

U.S. PATENT DOCUMENTS

| | | | | |
|---|---|---|---|---|
| 7,634,336 | B2* | 12/2009 | Chae | G05D 1/0234 180/167 |
| 8,285,475 | B2* | 10/2012 | Tan | G01C 11/00 701/300 |
| 8,312,660 | B1* | 11/2012 | Fujisaki | F41A 17/08 42/70.11 |
| 8,379,966 | B2 | 2/2013 | Jeong et al. | |
| 8,676,273 | B1* | 3/2014 | Fujisaki | H04M 1/0202 455/567 |
| 9,083,461 | B2* | 7/2015 | Chin | H04B 10/114 |
| 9,880,009 | B2* | 1/2018 | Bell | G06T 5/20 |
| 9,955,559 | B2* | 4/2018 | Engelen | G05D 1/0234 |
| 2004/0202351 | A1* | 10/2004 | Park | G05D 1/0234 382/104 |
| 2009/0157309 | A1* | 6/2009 | Won | H04B 10/116 701/533 |
| 2011/0153201 | A1* | 6/2011 | Park | G01C 21/20 701/533 |
| 2013/0027576 | A1* | 1/2013 | Ryan | H04W 4/33 348/222.1 |
| 2013/0245937 | A1* | 9/2013 | DiBernardo | G05D 1/0234 701/514 |
| 2014/0003823 | A1* | 1/2014 | Roberts | H04L 27/04 398/187 |
| 2014/0207282 | A1* | 7/2014 | Angle | H04L 12/2809 700/257 |
| 2014/0286644 | A1* | 9/2014 | Oshima | H04B 10/116 398/118 |
| 2015/0094900 | A1* | 4/2015 | Bell | G06T 7/13 701/28 |
| 2015/0190925 | A1* | 7/2015 | Hoffman | B25J 9/1671 700/257 |
| 2015/0281905 | A1* | 10/2015 | Breuer | H04B 10/116 398/118 |
| 2016/0037293 | A1* | 2/2016 | Jovicic | H05B 47/195 398/118 |
| 2016/0061623 | A1* | 3/2016 | Pahwa | G01C 21/3626 701/440 |
| 2017/0023963 | A1* | 1/2017 | Davis | H04W 48/16 |
| 2017/0099571 | A1* | 4/2017 | Aggarwal | H04W 4/02 |
| 2017/0170899 | A1* | 6/2017 | Breuer | G06K 9/4661 |
| 2017/0213449 | A1* | 7/2017 | Tchedikian | G06F 3/017 |
| 2017/0344017 | A1* | 11/2017 | Liu | G05D 1/028 |
| 2017/0346558 | A1* | 11/2017 | Zhang | H04B 10/116 |
| 2017/0361468 | A1* | 12/2017 | Cheuvront | G06F 16/00 |
| 2019/0107628 | A1* | 4/2019 | Marmet | G01C 21/206 |

FOREIGN PATENT DOCUMENTS

| | | | |
|---|---|---|---|
| KR | 20-0305679 | 3/2003 | |
| KR | 10-2008-0038757 | 5/2008 | |
| KR | 10-2016-0028239 | 3/2016 | |
| WO | WO-2018023227 A1 * | 2/2018 | ............... G05D 1/12 |

OTHER PUBLICATIONS

European Search Report dated Jun. 6, 2018 issued in EP Application No. 18151772.3.

* cited by examiner

MOVING ROBOT

CROSS-REFERENCE TO RELATED APPLICATION

This application claims priority under 35 U.S.C. § 119 to Korean Application No. 10-2017-0007216 filed on Jan. 16, 2017, whose entire disclosure is hereby incorporated by reference.

BACKGROUND

1. Field

The present invention relates to a moving robot, and more particularly, to a moving robot determining the location of a light device through communication with the light device.

2. Background

A moving robot is an apparatus which autonomously travels an area to be cleaned and automatically cleans the area by sucking an alien substance, such as dust, from a floor surface.

The moving robot is equipped with a rechargeable battery and can freely move and autonomously move using the operating power of the battery. The moving robot is configured to perform cleaning by sucking an alien substance on the floor surface while in motion, and to return to a charging stand and charge the battery, if necessary.

In general, the moving robot detects the distance to an obstacle, such as furniture, office supplies or a wall disposed in a driving area, and performs an obstacle avoidance operation by controlling the driving of a left wheel and a right wheel.

In the IoT (Internet of Things) environment, devices capable of communication can perform communication and may be connected through wired or wireless communication. In this case, a specific device may remotely control another device. In such an IoT environment, a moving robot may obtain information about other devices by performing communication with other devices, and may control other devices. For example, the moving robot may obtain information about a washing machine, a refrigerator, a light device, an air-conditioner and other home appliances capable of communication, and may remotely control them.

The moving robot may generate the map of a driving area by obtaining surrounding images and sensing surrounding objects. Information about the map of the driving area may be previously stored information or may be externally provided information. The moving robot may move to a specific location within the driving area based on the map of the driving area, and may determine the current location.

The moving robot may determine the current location in such a way as to extract feature points from a captured image of a surrounding environment. Furthermore, the moving robot may detect variety of types of objects from the captured image.

In the environment in which illuminance is insufficient, however, there is a problem in that it is difficult for the moving robot to determine the current location or detect an object through a captured image. Accordingly, if at least one light device that may be remotely controlled by the moving robot is present in a driving area, it is necessary for the moving robot to determine the location of the light device that may be controlled.

Furthermore, if the location of a light device is to be determined, when it is impossible to determine the current location or detect an object based on a captured image because surroundings are dark, it is necessary for the moving robot to secure illuminance by controlling an adjacent light device.

Furthermore, during a user's absence, it is necessary to reduce energy in such a manner that the moving robot turns on only a necessary light and turns off an unnecessary light.

BRIEF DESCRIPTION OF THE DRAWINGS

The embodiments will be described in detail with reference to the following drawings in which like reference numerals refer to like elements wherein.

DETAILED DESCRIPTION

Figure 1:
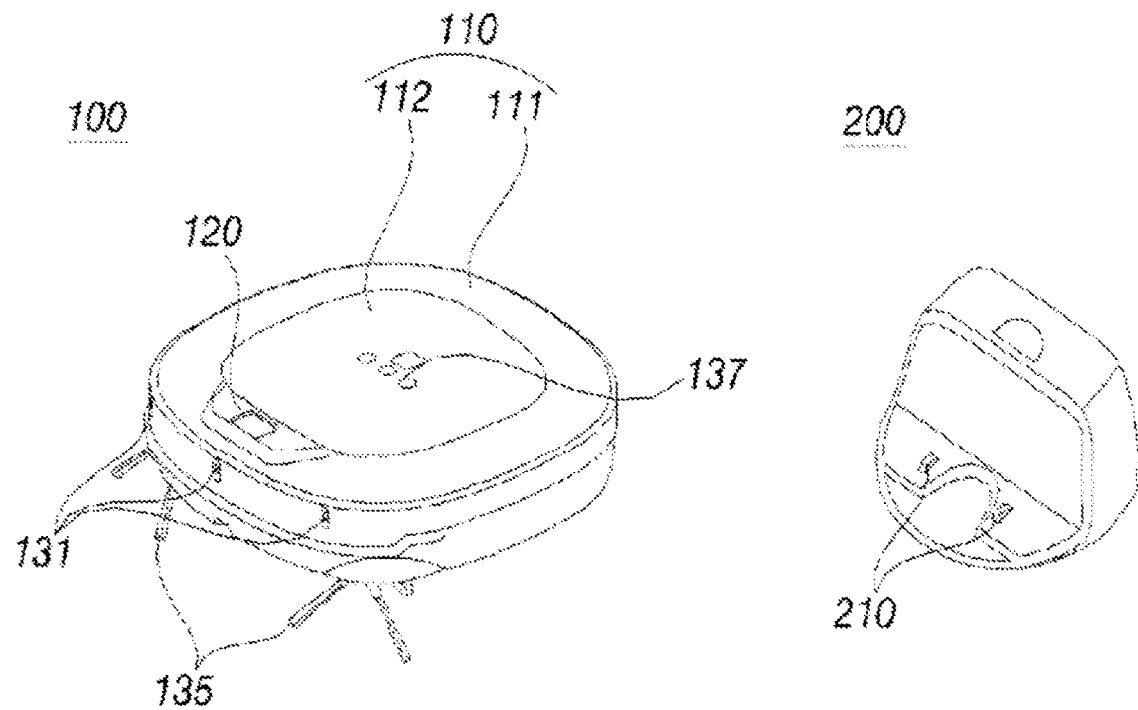
FIG. 1 is a perspective view showing a moving robot according to an embodiment of the present invention and a charging stand for charging the moving robot.

The present disclosure and methods of accomplishing the same may be understood more readily by reference to the following detailed description of embodiments and the accompanying drawings. However, the present disclosure may be embodied in many different forms, and should not be construed as being limited to the embodiments set forth herein. Rather, these embodiments are provided so that this disclosure will be thorough and complete and will fully covey the concept of the invention to those skilled in the art, and the present disclosure will only be defined by the appended claims. Like reference numerals designate like elements throughout the specification.

A moving robot according to an embodiment of the present invention may remotely control a light device whose communication is connected in the IoT environment.

The moving robot controls the light device so that it is turned on off and flickers, and may determine the location of the light device by detecting the light device that generates an illuminance change based on an image captured by an image acquisition unit. The moving robot may determine the location of the light device in response to a user's input received through an input unit.

The moving robot may generate the light map of a driving area where the location of a light device is indicated by displaying the location of the light device determined in the map of a previously stored driving area.

Thereafter, in determining the current location or detecting an object based on an acquisition image, if illuminance is insufficient, the moving robot may turn on a light device corresponding to the location of the moving robot using the generated light map and secure necessary illuminance.

Hereinafter, various embodiments of the present invention are described in detail with reference to the drawings. An outward appearance and configuration of a moving robot according to an embodiment of the present invention are described with reference to FIGS. 1 to 5. Examples in which the moving robot according to an embodiment of the present invention determines the location of a light device and controls the light device are described with reference to FIGS. 6 to 11.

Figure 2:
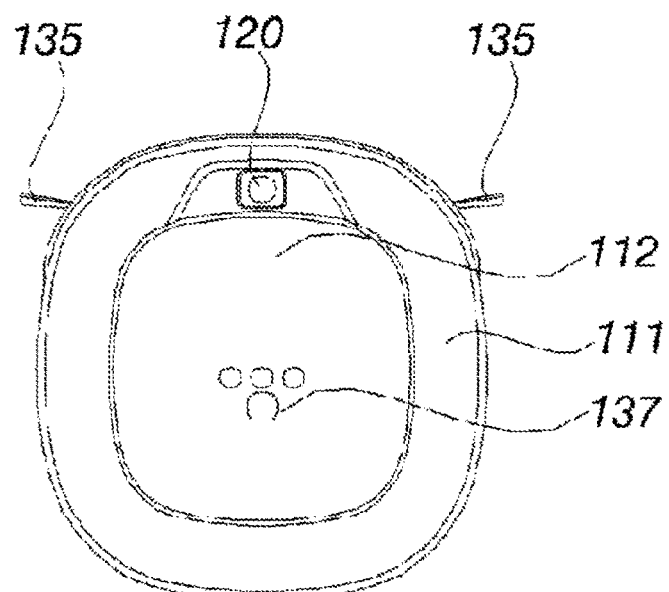
FIG. 2 is a diagram showing the top portion of the moving robot according to an embodiment of the present invention.
Figure 3:
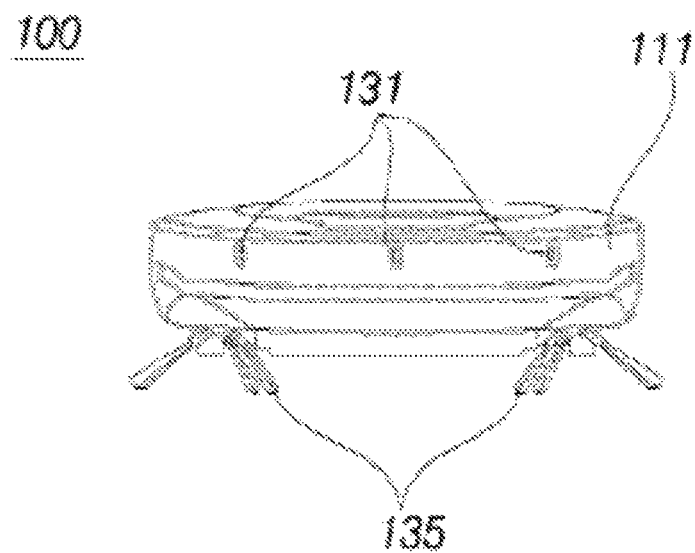
FIG. 3 is a diagram showing the front portion of the moving robot according to an embodiment of the present invention.
Figure 4:
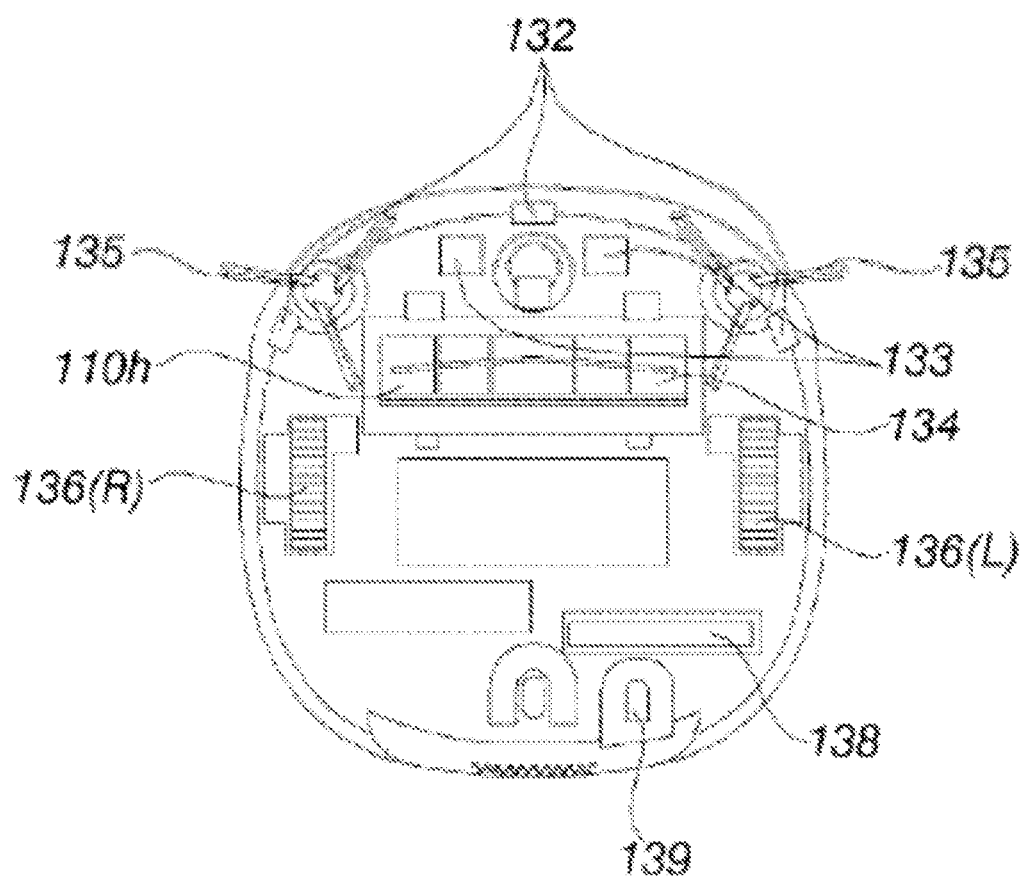
FIG. 4 is a diagram showing the bottom portion of the moving robot according to an embodiment of the present invention.

FIG. 1 is a perspective view showing a moving robot according to an embodiment of the present invention and a charging stand for charging the moving robot. FIG. 2 is a diagram showing the top portion of the moving robot according to an embodiment of the present invention. FIG. 3 is a diagram showing the front portion of the moving robot according to an embodiment of the present invention. FIG. 4 is a diagram showing the bottom portion of the moving robot according to an embodiment of the present invention.

As shown in FIGS. 1 to 4, the moving robot 100 includes a main body 110 and an image acquisition unit (or image sensor or sensor) 120 configured to obtain images around the main body 110. Hereinafter, in defining each portion of the main body 110, a portion directed toward a ceiling within a driving area is defined as a top portion (refer to FIG. 2), a portion directed toward a bottom within the driving area is defined as a bottom portion (refer to FIG. 4), and a portion that belongs to portions forming the circumference of the main body 110 between the top portion and the bottom portion and that is directed toward a driving direction is defined as a front portion (refer to FIG. 3).

The moving robot 100 includes a driving unit (or motor) 160 configured to move the main body 110. The driving unit 160 includes at least one driving wheel 136 configured to move the main body 110. The driving unit 160 includes a driving motor (not shown) connected to the driving wheel 136 to rotate the driving wheel. The driving wheel 136 may be provided on the right and left sides of the main body 110. Hereinafter, a wheel on the left side and a wheel on the right side are called a left wheel 136(L) and a right wheel 136(R), respectively.

The left wheel 136(L) and the right wheel 136(R) may be driven by a single driving motor, but may be equipped with a left wheel driving motor for driving the left wheel 136(L) and a right wheel driving motor for driving the right wheel 136(R), if necessary. The rotation speed of the left wheel 136(L) and the rotation speed of the right wheel 136(R) have a difference, so the driving direction of the main body 110 may switch to the left or right side.

An intake port 110h for sucking air may be formed in the bottom portion of the main body 110. An intake device (not shown) that provides a suction force so that air can be sucked through the intake port 110h and a dust canister (not shown) that collects dust sucked along with air through the intake port 110h may be provided within the main body 110.

The main body 110 may include a case 111 that forms the space in which a variety of types of parts forming the moving robot 100 are received. An opening part for the insertion or detachment of the dust canister may be formed in the case 111. A dust canister cover 112 that opens or shuts the opening part may be provided rotatably with respect to the case 111.

A roll type main brush 134 having brushes exposed through the intake port 110h and an auxiliary brush 135 located on the front side of the bottom portion of the main body 110 and having a plurality of radially extended wings may be provided. Dust is separated from the bottom within the driving area by the rotation of the brushes 134 and 135. The dust separated from the bottom is sucked through the intake port 110h and collected by dust canister.

A battery 138 supplies power necessary for an overall operation of the moving robot 100 in addition to the driving motor. When the battery 138 is discharged, the moving robot 100 may perform driving for returning to a charging stand 200 for charging purposes. During such return driving, the moving robot 100 may autonomously detect the location of the charging stand 200.

The charging stand 200 may include a signal transmitter (not shown) for transmitting a specific return signal. The return signal may be an ultrasonic signal or an infrared signal, but does not need to be necessarily limited thereto.

The moving robot 100 may include a signal detector (not shown) for receiving a return signal. The charging stand 200 transmits an infrared signal through the signal transmitter. The signal detector may include an infrared sensor for detecting an infrared signal. The moving robot 100 moves to the location of the charging stand 200 in response to an infrared signal transmitted by the charging stand 200, and docks on the charging stand 200. By such docking, charging is performed between the charging terminal 133 of the moving robot 100 and the charging terminal 210 of the charging stand 200.

The image acquisition unit 120 photographs the driving area and may include a digital camera. The digital camera may include at least one optical lens, an image sensor (e.g., a CMOS image sensor) configured to include a plurality of photodiodes (e.g., pixels) on which an image is focused by light passing through the optical lens, and a digital signal processor (DSP) configured to form an image based on signals output by the photo diodes. The DSP may generate a moving image formed of frames consisting of a still image in addition to a still image.

The image acquisition unit 120 may be provided in the top portion of the main body 110 to obtain an image of the ceiling within the driving area, but the location and photographing range of the image acquisition unit 120 do not need to be necessarily limited thereto. For example, the image acquisition unit 120 may be provided to obtain an image of the front of the main body 110.

Furthermore, the moving robot 100 may further include an obstacle detection sensor 131 for detecting an obstacle at the front. The moving robot 100 may further include a cliff detection sensor 132 for detecting whether a cliff is present on the floor within the driving area and a lower camera sensor 139 for obtaining an image of the floor.

Furthermore, the moving robot 100 includes an input unit 137 capable of receiving On/Off or a variety of types of commands. A variety of types of control commands necessary for an overall operation of the moving robot 100 may be received through the input unit 137. Furthermore, the moving robot 100 includes an output unit (not shown), so it can display reservation information, a battery state, an operating mode, an operating state, and an error state.

Figure 5:
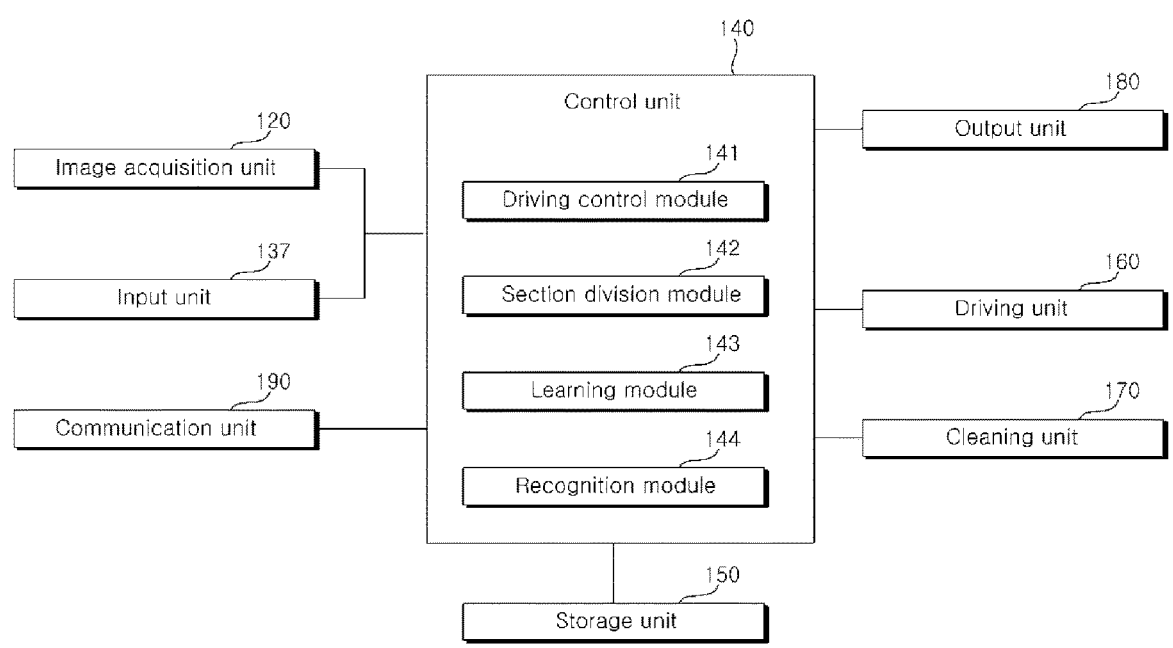
FIG. 5 is a block diagram for illustrating the elements of the moving robot according to an embodiment of the present invention.

FIG. 5 is a block diagram for illustrating the elements of the moving robot according to an embodiment of the present invention. Referring to FIG. 5, the moving robot 100 may include an image acquisition unit (or image sensor) 120, an input unit (or user interface) 137, a control unit (or controller) 140, a storage unit (or memory) 150, a driving unit (or motor) 160, a cleaning unit (or suction head) 170, an output unit (or display) 180, and a communication unit (or communication interface) 190.

The moving robot 100 may receive a command for an operation transmitted by a remote controller (not shown) or a mobile terminal (not shown) through the communication unit 190.

The mobile terminal is equipped with an app for controlling the moving robot 100, and may display the map of a driving area to be cleaned by the moving robot 100 through the execution of the app and designate an area in the map so that a specific area is cleaned. The mobile terminal may be a remote controller, a PDA, a laptop, a smart phone or a tablet PC in which an app for setting a map is installed, for example.

The mobile terminal may display the current location of the moving robot 100 along with a map through communication with the moving robot, and may display information about a plurality of areas. Furthermore, the mobile terminal updates the location of the moving robot as the moving robot travels, and displays the updated location.

The control unit 140 controls an overall operation of the moving robot 100 by controlling the image acquisition unit 120, the input unit 137, and the driving unit 160 forming the moving robot 100.

The storage unit 150 records a variety of types of information necessary for control of the moving robot 100, and may include a volatile or non-volatile recording medium. The recording medium stores data to be readable by a microprocessor), and may include a hard disk drive (HDD), a solid state disk (SSD), a silicon disk drive (SDD), ROM, RAM, CD-ROM, a magnetic tape, a floppy disk, and an optical data storage device.

The storage unit 150 may store the map of a driving area. The map may be input by the mobile terminal capable of exchanging information through wired or wireless communication with the moving robot 100 or may be generated by the autonomous learning of the moving robot 100.

The location of rooms within a driving area may be indicated in a map. Furthermore, the current location of the moving robot 100 may be indicated in the map. The current location of the moving robot 100 in the map may be updated in a driving process. The mobile terminal stores the same map as a map stored in the storage unit 150.

While the control unit 140 controls the driving of the moving robot 100, it may drive the cleaning unit 170 so that dust or an alien substance around the moving robot 100 can be absorbed. At this time, a brush (not shown) within the cleaning unit 170 is driven to make dust or an alien substance around the moving robot 100 the state in which the dust or alien substance can be easily sucked. An intake device (not shown) provided in the cleaning unit 170 can suck the dust or alien substance.

The control unit 140 may control the moving robot 100 so that it performs cleaning while moving to a specific area through the driving unit 160.

The control unit 140 may include a driving control module 141, a section division module 142, a learning module 143, and a recognition module 144. The driving control module 141 controls the driving of the moving robot 100 and controls the driving of the driving unit 160 according to driving setting. Furthermore, the driving control module 141 may check the moving path of the moving robot 100 based on an operation of the driving unit 160. For example, the driving control module 141 may check the current or past moving speed, driving distance, etc. of the moving robot 100 based on the rotation speed of the driving wheel 136, and may also check a current or past direction switch process based on the rotation direction of each of the driving wheels 136(L) and 136(R). The location of the moving robot 100 in a map may be updated based on the checked driving information of the moving robot 100.

The section division module 142 may divide a driving area into a plurality of sections according to a specific criterion. The driving area may be defined as a scope, including all of sections on the plane on which the moving robot 100 has driven and all of sections on the plane on which the moving robot 100 now drives.

The section division module 142 divides a driving area into a plurality of small sections. The small sections may be divided based on respective rooms within the driving area. Furthermore, the section division module 142 may divide a driving area into a plurality of separated large section in terms of the driving capability. For example, two indoor spaces fully separated in terms of the flow may be divided into two large sections. For another example, the large sections within the same indoor space may be divided based on respective layers within the driving area.

The learning module 143 may generate the map of a driving area. Furthermore, the learning module 143 recognizes a global location by processing images of locations obtained by the image acquisition unit 120 and associating the images with a map.

The recognition module 144 recognizes the current location by estimating the current location. The recognition module 144 may recognize the current location through estimation although the location of the moving robot 100 is suddenly changed by checking a location in association with the learning module 143 using image information of the image acquisition unit 120.

The moving robot 100 may recognize a location during continuous driving through the section division module 142, and may learn a map and estimate the current location through the learning module 143 and the recognition module 144 without the section division module 142.

While the moving robot 100 drives, the image acquisition unit 120 obtains images around the moving robot 100. Hereinafter, an image obtained by the image acquisition unit 120 is defined as an "acquisition image." The acquisition image includes several features of lights located in a ceiling, an edge, a corner, blob, and a ridge. Hereinafter, the feature may also be expressed as a feature point.

The learning module 143 detects features from each of the acquisition images. In the computer vision technology field, various methods (feature detection) of detecting a feature from an image are known. Several feature detectors suitable to detect such features are known. For example, the feature detectors may include Canny, Sobel, Harris & Stephens/Plessey, SUSAN, Shi & Tomasi, Level curve curvature, FAST, Laplacian of Gaussian, Difference of Gaussians, Determinant of Hessian, MSER, PCBR, and Grey-level blobs detector.

The learning module 143 calculates a descriptor based on each feature point. The learning module 143 may transform the feature point into the descriptor using a scale invariant feature transform (SIFT) scheme for the feature detection. The descriptor may be marked as an n-dimension vector.

The SIFT may detect an invariant feature (i.e., rotation-invariant) although the same area is photographed at a varying posture of the moving robot 100 because an invariant feature for the scale, rotation and brightness change of an object to be photographed can be sensed by the SIFT, but the present invention is not limited thereto. Other various schemes (e.g., histogram of oriented gradient (HOG), Haar feature, Fems, local binary pattern (LBP), and modified Census transform (MCT)) may be applied.

The learning module 143 may divide at least one descriptor into a plurality of groups according to a specific lower classification rule for each acquisition image based on descriptor information obtained through an acquisition image of each location, and may transform descriptors included in the same group into a lower representative descriptor according to a specific lower representative rule.

For another example, the learning module 143 may classify all of descriptors collected from acquisition images within a specific section, such as a room, into a plurality of groups according to a specific lower classification rule, and may transform descriptors included in the same group into respective lower representative descriptors according to the specific lower representative rule.

The learning module 143 may calculate a feature distribution of each location through such a process. The feature distribution of each location may be expressed as a histogram or n-dimension vector. For another example, the learning module 143 may estimate an unknown current location based on a descriptor calculated from each feature point without experiencing a specific lower classification rule and a specific lower representative rule.

If the current location of the moving robot 100 is in the unknown state for a reason, such as a location jump, the learning module 143 may estimate the current location based on data, such as a previously stored descriptor or a lower representative descriptor.

The moving robot 100 obtains an acquisition image from an unknown current location through the image acquisition unit 120. Several features, such as lights located in the ceiling, an edge, a corner, blob, and a ridge, are checked through images.

The recognition module 144 detects features in an acquisition image. In the computer vision technology field, various methods of detecting features from an image and several feature detectors suitable to detect such features are described above.

The recognition module 144 calculates a recognition descriptor based on each recognition feature point through a recognition descriptor calculation step. In this case, the recognition feature point and the recognition descriptor are used to describe a process performed by the recognition module 144, and are different from terms that describe a process performed by the learning module 143. However, features in the outside world of the moving robot 100 are merely defined as different terms.

The recognition module 144 may transform a recognition feature point into a recognition descriptor using a scale invariant feature transform (SIFT) scheme for such feature detection. The recognition descriptor may be expressed as an n-dimension vector.

As described above, the SIFT is an image recognition scheme for selecting a feature point that may be easily identified, such as a corner point in an acquisition image, and calculating an n-dimension vector in which a sudden degree of a change in each direction is expressed as a numerical value for each dimension with respect to distribution characteristics (e.g., a direction in a change of brightness and a sudden degree of a change) of the bright gradient of pixels that belong to a specific section around each feature point.

The recognition module 144 transforms at least one piece of recognition descriptor information, obtained through an acquisition image of an unknown current location, into location information (e.g., a feature distribution of each location), that is, an object of comparison, and information (e.g., a lower recognition feature distribution) that may be compared according to a specific lower transform rule.

Each similarity may be calculated by comparing each location feature distribution with each recognition feature distribution according to a specific lower comparison rule. Similarity (or probability) corresponding to each location may be calculated for each location, and a location having the greatest probability may be determined to be the current location.

As described above, the control unit 140 may divide a driving area and generate a map including a plurality of regions or may recognize the current location of the main body 110 based on a previously stored map. When a map is generated, the control unit 140 transmits the generated map to the mobile terminal through the communication unit 190. Furthermore, when a map is received from the mobile terminal as described above, the control unit 140 may store the map in the storage unit 150.

Furthermore, if a map is updated during driving, the control unit 140 transmits updated information to the mobile terminal so that a map stored in the mobile terminal and a map stored in the moving robot 100 are the same. Since the maps stored in the mobile terminal and the moving robot 100 are identically maintained, the moving robot 100 can clean a designated area in response to a cleaning command from the mobile terminal. Furthermore, the current location of the moving robot can be displayed in the mobile terminal.

In this case, the map includes a cleaning area divided into a plurality of areas and a connection passage connecting the plurality of areas. The map further includes information about an obstacle within each area. As described above, the cleaning area is divided into a small area and a large area by the section division module 142.

When a cleaning command is received, the control unit 140 determines whether a location in a map is identical with the current location of the moving robot. The cleaning command may be received from the remote controller, the input unit or the mobile terminal.

If the current location is not identical with a location in a map or the current location cannot be confirmed, the control unit 140 recognizes the current location, restores the current location of the moving robot 100, and controls the driving unit so that the moving robot moves to a designated area based on the current location.

If the current location is not identical with a location in a map or the current location cannon be confirmed, the recognition module 144 may estimate the current location based on a map by analyzing an acquisition image received from the image acquisition unit 120. Furthermore, the section division module 142 or the learning module 143 may recognize the current location as described above.

After the location is recognized and the current location of the moving robot 100 is recovered, the driving control module 141 calculates a moving path from the current location to a designated area and controls the driving unit 160 so that the moving robot moves to the designated area. If at least one of a plurality of areas is selected through the mobile terminal, the driving control module 141 sets the selected area as a designated area and calculates a moving path. After the moving robot moves to the designated area, the driving control module 141 performs cleaning.

If a plurality of areas is selected as a designated area, the driving control module 141 determines whether the priority area of the plurality of areas is set or whether the cleaning sequence of the plurality of selected designated areas is set, and the moving robot performs cleaning after moving to the designated area.

If any one of a plurality of designated area is set as a priority area, the driving control module 141 moves to the priority area of the plurality of designated area, first cleans the priority area, then moves to the remaining designated areas, and cleans them. Furthermore, if a cleaning sequence is assigned to designated areas, the driving control module 141 performs control so that the moving robot performs cleaning while sequentially moving to the designated areas according to the designated cleaning sequence.

Furthermore, if a specific area is newly set regardless of the division of a plurality of areas in a map, the driving control module 141 performs control so that the moving robot moves to the set designated area and performs cleaning.

When the cleaning of a set designated area is completed, the control unit 140 stores a cleaning record in the storage unit 150. The control unit 140 transmits the operating state or cleaning state of the moving robot 100 to the mobile terminal in a specific cycle through the communication unit 190. Accordingly, the mobile terminal displays the location of the moving robot on a screen of an app being executed along with a map based on received data, and outputs information about the cleaning state.

The output unit 180 may include a display unit (not shown) for displaying an image and a sound output unit 180 for outputting a sound. For example, the sound output unit 180 may be a speaker.

The moving robot 100 according to an embodiment of the present invention may determine the current location using feature points sensed from an image obtained by a camera. The moving robot 100 may generate the map of a driving area based on location information determined through simultaneous localization and map-building (SLAM).

The moving robot 100 may remotely control a preset light device 500 by performing communication with the light device. The preset light device 500 may be at least one light device disposed in a driving area. Accordingly, the moving robot 100 may turn on or off the light device 500 disposed in the driving area. The moving robot 100 may determine the location of the light device 500 by turning on or off the light device 500.

The control unit 140 may control the light device 500 through the communication unit 190. The control unit 140 may transmit a control signal for controlling the light device 500 through the communication unit 190.

In an embodiment of the present invention, the light device 500 is disposed in a driving area 600. The light device 500 may include a communication module capable of a communication connection with the control unit 140. The light device 500 may receive a control signal from the control unit 140 through the communication module. The light device 500 may operate in response to the control signal. For example, the light device 500 may be turned on or off or may be repeatedly turned on and off in a specific cycle in response to the control signal. Hereinafter, the turning-on of the light device 500 is expressed as On, and the turning-off of the light device 500 is expressed as Off.

The moving robot 100 and the light device 500 may perform communication via a sharer, a gateway or may directly perform wireless communication, or may perform communication through the medium of a terminal or a server. The communication of the moving robot 100 with the light device 500 means communication between the moving robot 100 and the light device 500 via a sharer, a gateway, a terminal and/or a server in addition to direct communication between the moving robot 100 and the light device 500 without the intervention of another device.

For example, the communication unit 190 of the moving robot 100 may directly perform communication with the light device 500 using Bluetooth.

For another example, the communication unit 190 of the moving robot 100 may transmit a signal to a server and the server may transmit a signal to the light device 500, so the communication unit 190 of the moving robot 100 can perform communication with the light device 500.

For yet another example, the communication unit 190 of the moving robot 100 may transmit a signal to a terminal and the terminal may transmit a signal to the light device 500, so the communication unit 190 of the moving robot 100 can perform communication with the light device 500.

For yet another example, the communication unit 190 of the moving robot 100 may transmit a signal to a terminal, the terminal may transmit a signal to a server, and the server may transmit a signal to the light device 500, so the communication unit 190 of the moving robot 100 can perform communication with the light device 500.

Furthermore, the communication of the moving robot 100 with the light device 500 includes a case where the moving robot 100 transmits a signal to the light device 500, but the light device 500 does not transmit a signal to the moving robot 100 in addition to a case where the moving robot 100 and the light device 500 exchange signals.

The communication unit 190 of the moving robot 100 performs wireless communication in a network environment. The communication module of the light device 500 may perform wireless communication or may perform wired communication with a sharer or a gateway.

Hereinafter, a method and system for controlling the moving robot 100 according to embodiments of the present invention are described with reference to FIGS. 6 to 12. An embodiment of the present invention may be a computer program that implements the steps of the control method or may be a recording medium on which a program for implementing the control method is recorded. The "recording medium" means a computer-readable recording medium. An embodiment of the present invention may be a system including both hardware and software.

The control method includes a location determination step in which the moving robot 100 moves within a driving area, communicates in order to perform on/off control of the light device 500, and determines the location of the light device 500 based on an illuminance change sensed in an acquisition image.

In some embodiments, the control method may be performed by the control unit 140 only or may be performed by the control unit 140 and the terminal 300 or the light device

500. Hereinafter, the control method is illustrated as being performed by the control unit 140, but the present invention does not need to be necessarily limited thereto.

Figure 6:
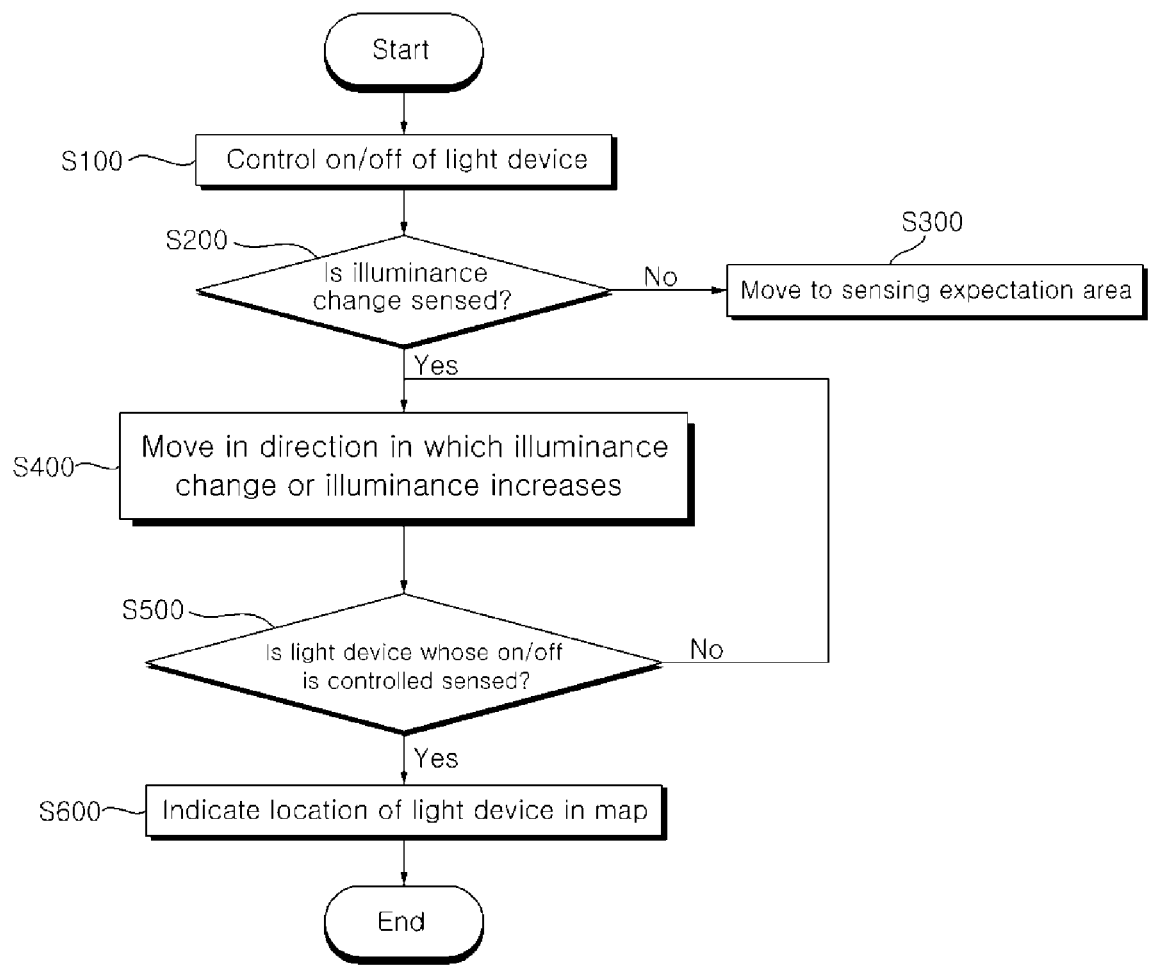
FIG. 6 is a flowchart for illustrating a process of the moving robot to determine the location of a light device according to an embodiment of the present invention.

FIG. 6 is a flowchart for illustrating a process of the moving robot to determine the location of the light device according to an embodiment of the present invention. The control unit 140 may control the light device 500. The control unit 140 may control the on/off of the light device 500 (S100). The control unit 140 may perform the following "on/off control."

The "on/off control" performed by the control unit 140 may include at least any one of that the light device 500 is controlled so that it is off, that the light device 500 is controlled so that it is on, and that the light device 500 is controlled so that it repeats on and off for a specific time. For example, the control unit 500 may control the light device 500 so that the light device 500 of the off state becomes on. Furthermore, the control unit 140 may control the light device 500 so that it repeats on and off in a cycle of 1 second for 10 seconds. A detailed method of the control unit 140 to determine the location of the light device 500 may be different depending on a method of controlling the light device 500.

The light device 500 may be plural. If the number of light devices 500 is plural, the control unit 140 may perform various types of on/off control in order to determine the location of at least one of light devices 500 whose location has not been determined.

For example, the control unit 140 may perform on/off control on one of the plurality of light devices 500, may sequentially perform on/off control on all of the plurality of light devices 500, or may control all of the plurality of light devices 500 so that they repeat on/off in different cycles at the same time. A detailed method of the control unit 140 to determine the location of the light device 500 may be different depending on an on/off control method for the light device 500.

The plurality of light devices 500 may be present in the driving area 600. The light device 500 located in the driving area 600 may be configured to be capable of communicating with the moving robot 100. The storage unit may store communication configurations and a variety of types of information for performing communication with the light device 500 located in the driving area 600. The control unit 140 may perform communication with the plurality of light devices 500 located in the driving area 600 based on information for communication with the light devices 500 stored in the storage unit. The control unit 140 may remotely control the light device 500 or may determine the operating state of the light device 500 by communicating with the light device 500. If a light device that belongs to the light devices 500 disposed in the driving area 600, that has not been previously set and that is capable of communication is sensed, the control unit 140 may perform a communication connection with the corresponding light device and control the light device 500.

The driving area 600 may include a plurality of rooms. At least one light device 500 may be disposed in each of the plurality of rooms included in the driving area 600. The control unit 140 may perform on/off control of the light device 500, and may determine whether an illuminance change is sensed based on an image obtained by the image acquisition unit 120 (S200).

For example, if an area where illuminance increases or decreases is sensed in the acquisition image, the control unit 140 may determine that illuminance varies. The control unit 140 may determine the location of the light device 500 based on an illuminance change sensed in the image. Hereinafter, a detailed process is described.

When an illuminance change is sensed in the image, the control unit 140 may move the main body 110 in the direction in which the sensed illuminance increases or in the direction in which the sensed illuminance change increases (S400).

If an illuminance change is sensed in state of that the light device 500 is controlled so that it becomes on, the control unit 140 moves the main body 110 in the direction in which illuminance increases. If the light device 500 of the off state is controlled in the on state and an increase of illuminance is sensed through an acquisition image, the control unit 140 may determine that illuminance has increased due to light emitted by the light device 500 controlled in the on state. In this case, the control unit 140 may move the main body 110 in the direction in which illuminance increases, so the moving robot 100 becomes close to the location of the light device 500. The control unit 140 may determine a point at which illuminance is a maximum based on an acquisition image while the main body 110 moves. The control unit 140 may determine that a light device is located at the point at which illuminance is a maximum.

In order to move the main body 110 in the direction in which illuminance increases, the control unit 140 may measure illuminance at a plurality of points within an acquisition image. The control unit 140 may perform a comparison on illuminance at the respective points and move the main body 110 to the point at which illuminance sensed in the image is a maximum. Light that affects illuminance is emitted by the light device 500, and thus the point at which illuminance is a maximum may be a point at which the light device 500 is located. If the light device 500 is on, brightness at each point in the image is higher as it becomes close to the light device 500, and thus illuminance may be higher at a point close to the light device 500. Illuminance is higher as it becomes close to the light device 500. Accordingly, if the main body 110 of the moving robot 100 moves in the direction in which illuminance increases, the main body 110 and the light device 500 may become close. As a result, the direction in which sensed illuminance increases may be the direction in which a point at which the sensed illuminance is a maximum is present, and a direction close to the light device 500. The control unit 140 controls the main body 110 so that it becomes close to the light device 500 so that the light device is sensed in an acquisition image.

If an illuminance change is sensed in state of that the light device 500 is controlled so that it repeats on and off, the control unit 140 may move the main body 110 in the direction in which an illuminance change increases. If the light device 500 has been controlled so that it repeats on and off, when the repetition of an increase and decrease of illuminance is sensed through an acquisition image, the control unit 140 may determine that illuminance is changed due to light emitted by the light device 500 controlled so that it repeats on and off. In this case, the control unit 140 may move the main body 110 in the direction in which an illuminance change increases, so the moving robot 100 becomes close to the location of the light device 500. The control unit 140 may determine a point at which an illuminance change is a maximum based on an image obtained while the main body 110 moves. The control unit 140 may determine that a light device is located at the point at which the illuminance change is a maximum.

If an illuminance change is sensed in state of that the light device 500 is controlled so that it is off, the control unit 140 may control the light device 500 so that it repeats on and off, and may move the main body 110 in the direction in which an illuminance change increases. If the light device 500 has been controlled so that it is off, when an illuminance change is sensed, the control unit 140 may determine that light emitted by the light device 500 reaches the location of the main body 110. At this time, the control unit 140 determines that the light device 500 is located nearby and may control the light device 500 that has been off so that it repeats on and off in order to determine an accurate location of the light device 500. The control unit 140 may move the main body 110 in the direction in which an illuminance change increases, so the moving robot 100 becomes close to the location of the light device 500. The control unit 140 may determine a point at which an illuminance change is a maximum based on an image obtained while the main body 110 moves. The control unit 140 may determine that a light device is located at the point at which the illuminance change is a maximum.

In order to move the main body 110 in the direction in which an illuminance change increases, the control unit 140 may determine an illuminance change at a plurality of points within an acquisition image. The control unit 140 may perform a comparison on illuminance changes at the respective points and move the main body 110 to a point at which an illuminance change is a maximum. The point at which an illuminance change is a maximum is a point at which a difference between brightness when the light device 500 is on and brightness when the light device 500 is off is a maximum. If the light device 500 is off, brightness at each point in an image is constant. If the light device 500 is on, brightness at each point in an image is high as it becomes close to the light device 500. Accordingly, a point closer to the light device 500 may be a point at which an illuminance change is great. An illuminance change is greater as it becomes close to the light device 500. If the main body 110 of the moving robot 100 moves in the direction in which an illuminance change increases, the main body 110 and the light device 500 may become close. As a result, the direction in which a sensed illuminance change increases may be a direction in which a point at which the sensed illuminance change is a maximum is present, and a direction closer to the light device 500. The control unit 140 may control the main body 110 so that it becomes close to the light device 500, so the light device is sensed in an acquisition image.

If an illuminance change is not sensed in the image, the control unit 140 may move the main body 110 to a sensing expectation area (S300). The control unit 140 may perform on/off control of the light device 500 within the sensing expectation area (S100), and may determine whether an illuminance change is sensed (S200). The sensing expectation area may be one area in which a change of illuminance is expected to be sensed within the driving area 600. The control unit 140 may determine the sensing expectation area based on map information of the driving area 600 and current location information of the moving robot 100.

If an illuminance change is not sensed in surrounding images in a situation in which on/off control of the light device 500 is performed, the control unit 140 may determine that the current location of the main body 110 is a location at which light from the light device 500 does not arrive.

The control unit 140 may determine an expectation area where the light device 500 emitting light that cannot be sensed at the current location of the main body 110 may be present based on the map of the driving area 600. The control unit 140 may determine whether a barrier rib or object that may block light of the light device 500 is present in the map of the driving area 600. The control unit 140 may determine a sensing expectation area based on the location of an element that may block light of the light device 500 and the current location of the main body 110.

A plurality of sensing expectation areas may be present depending on the location of the main body 110 and a form of the driving area 600. In this case, the control unit 140 may move the main body 110 to the closest point of the plurality of sensing expectation areas.

The control unit 140 may determine whether an illuminance change is sensed in an image obtained by the image acquisition unit 120 while the main body 110 moves. If an illuminance change is sensed in an acquisition image before the main body 110 reaches a sensing expectation area, the control unit 140 may move the main body 110 in the direction in which a sensed illuminance change increases or in the direction in which sensed illuminance increases.

The control unit 140 may determine whether the light device 500 on which on/off control is performed is sensed while moving the main body 110 (S500). The control unit 140 may detect the light device 500 on which on/off control is performed based on an image obtained by the image acquisition unit 120. The control unit 140 may determine the location where the light device 500 on which on/off control is performed is detected.

If the main body 110 has moved in the direction in which illuminance increases, the control unit 140 may detect a point at which illuminance is a maximum in an acquisition image. In this case, the control unit 140 may determine the detected point at which illuminance is a maximum to be the location of a light device.

If the main body 110 has been moved in the direction in which an illuminance change increases, the control unit 140 may detect a point at which an illuminance change is a maximum in an acquisition image. At this time, the control unit 140 may determine a point at which a detected illuminance change is a maximum to be the location of the light device.

The control unit 140 may determine the location of the light device 500 in the driving area based on the current location of the main body 110 and the location and direction of the light device 500 detected in an image. If the number of light devices 500 is plural, the control unit 140 may determine the location of each of the light devices 500.

For example, if on/off control is performed on one of the plurality of light devices 500 and the light device 500 generating an illuminance change is detected, the control unit 140 may determine the detected light device 500 to be the light device 500 on which on/off control is performed. For example, the control unit 140 may control the plurality of light devices 500 so that they are sequentially turned on or off, and may determine the location of each of the plurality of light devices 500 based on light-emitting timing sensed in an acquisition image.

For example, the control unit 140 may control the plurality of light devices 500 so that one of the light devices 500 performs on/off in a specific cycle. If the light device 500 that flickers in the specific cycle is detected in an acquisition image, the control unit 140 may determine the detected light device 500 to be the light device 500 on which on/off control is performed.

The control unit 140 may generate a light map in which the location of the light device 500 determined in the map of the driving area is indicated (S600). The control unit 140 may generate a light map in which the location of the light device 500 is indicated by displaying the location of the light device 500 determined in a map stored in the storage unit (S600). The light map may be map information in which the driving area 600 and the deployment of the light device 500 within the driving area 600 is indicated.

If the location of at least one of a plurality of light devices 500 is determined, the control unit 140 may generate a light map. The generated light map may be stored in the storage unit. If the light device 500 whose location is newly determined is present, the control unit 140 may add the location of the light device 500 that has been newly determined to the light map stored in the storage unit.

Hereinafter, various embodiments in which the moving robot 100 according to an embodiment of the present invention determines the location of the light device 500 are described. In accordance with another embodiment of the present invention, the control unit 140 may determine the location of the light device 500 on which on/off control is performed, while performing on/off control on one of the plurality of light devices 500 and moving the main body 110 to the location where an illuminance change increases. In this case, the on/off control may include controlling the light device 500 so that it is turned on or off in a specific cycle. The control unit 140 may repeat the execution of the on/off control until the location of the light device 500 on which the on/off control is performed is determined. The control unit 140 may stop the execution of the on/off control for the light device 500 whose location has been determined.

In accordance with another embodiment of the present invention, if at least one light device 500 is present in each of a plurality of rooms, the control unit 140 may sequentially perform on/off control on a plurality of light devices 500 located in the driving area 600.

The control unit 140 may determine the deployment of the plurality of light devices 500 located in the driving area 600 by sequentially performing on/off control on the plurality of light devices 500 and controlling the main body 110 so that it sequentially enters the plurality of rooms.

If the main body 110 is located in one of the plurality of rooms, the control unit 140 may sequentially perform on/off control on the plurality of light devices 500, and may determine that a light device 500 generating an illuminance change in the room where the main body 110 has been located has been located in the room where the moving robot 100 has been located.

The control unit 140 may determine that a light device 500 not generating an illuminance change in the room where the main body 110 has been located has been disposed in any one of the remaining room. Thereafter, the control unit 140 may determine a light disposed in a corresponding room by sequentially performing on/off control on the remaining light devices 500 other than the light device 500 whose location has been determined after entering another room.

If the number of light devices 500 disposed in the room where the main body 110 has been located is determined to be plural, the control unit 140 may control the plurality of light devices 500 disposed in the room where the main body 110 has been located so that they repeat on/off in different cycles, and may determine the location of each of the plurality of light devices 500 disposed in the room where the main body 110 has been located based on the sensed on/off cycle of the light device 500.

Figure 7:
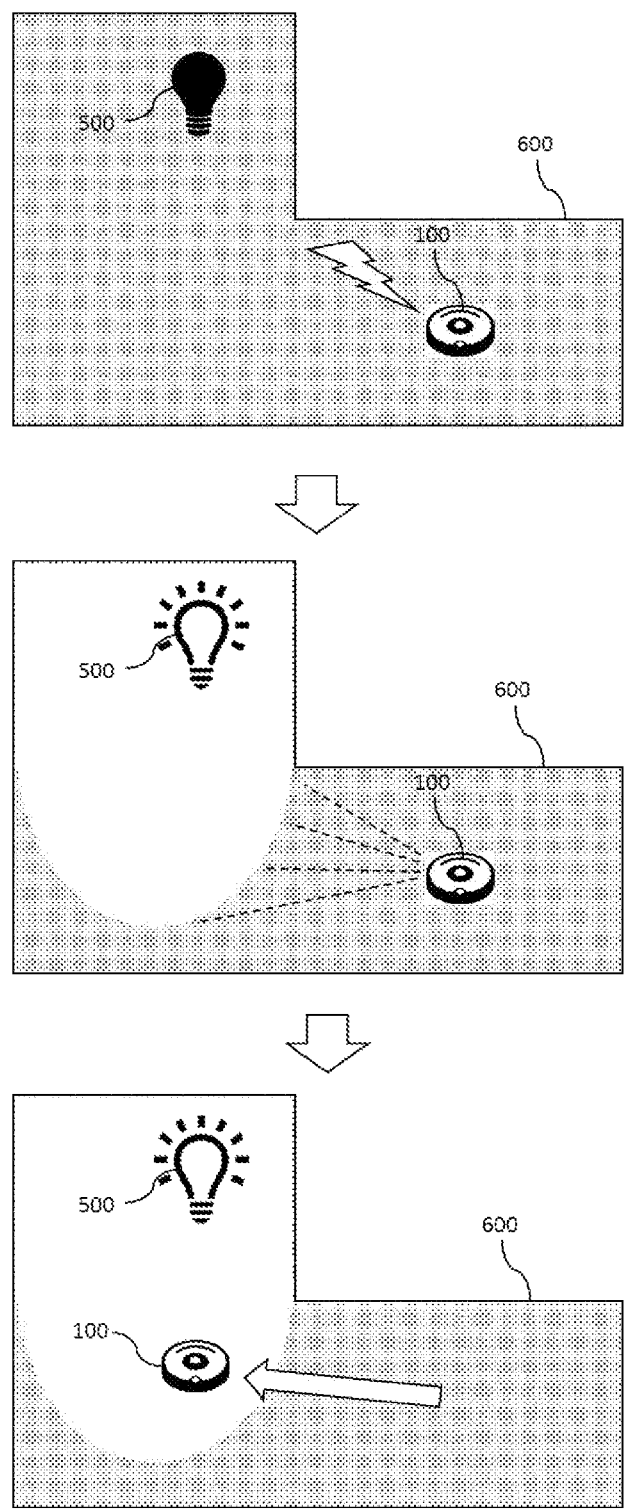
FIG. 7 is a diagram for illustrating that the moving robot moves in the direction in which an illuminance change increases and detects the location of a light device.

FIG. 7 is a diagram for illustrating that the moving robot 500 moves in the direction in which an illuminance change increases and detects the location of the light device 500. In accordance with the embodiment of FIG. 7, the control unit 140 may control the light device 500 of the off state so that it becomes on.

When the light device 500 becomes on, the control unit 140 may detect an illuminance change appearing in an image obtained by the image acquisition unit 120, but cannot detect the light device 500 that has been on. The control unit 140 may move the main body 110 to the area in which sensed illuminance is high. When the main body 110 moves to the area in which illuminance is high, the control unit 140 may sense the light device 500 in an acquisition image.

The control unit 140 may move in the direction in which the light device 500 appearing in an image is present in order to determine an accurate location of the light device 500. The control unit 140 may determine the location of the light device 500 based on the current location of the main body 110 and the location and direction of the light device 500 that appear in an image.

When the location of the light device 500 is determined, the control unit 140 may generate a light map by indicating the determined location of the light device 500 in the map. The control unit 140 may manage map information by storing the generated light map in the storage unit or transmitting the generated light map to a predetermined server.

Figure 8:
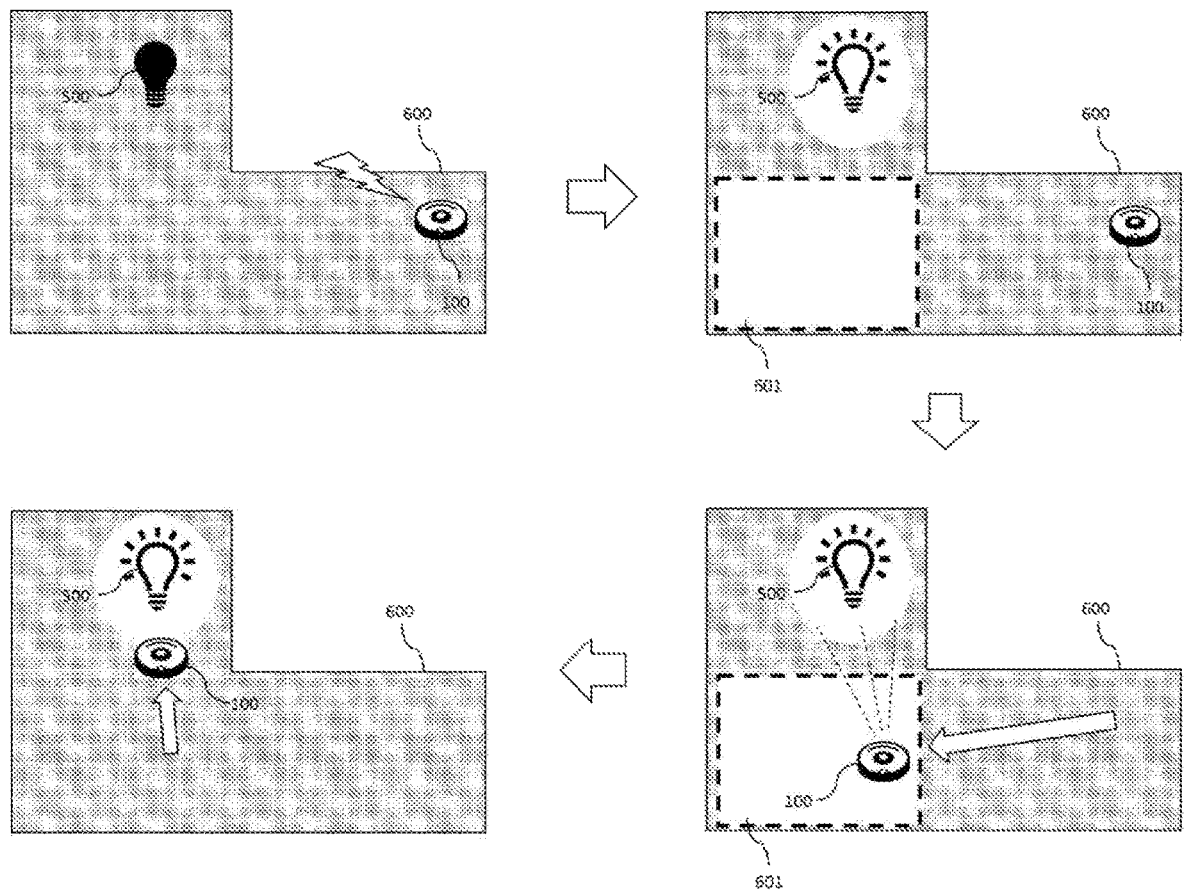
FIG. 8 is a diagram for illustrating that the moving robot performs on/off control of a light device and if an illuminance change is not sensed, the moving robot moves to a sensing expectation area and determines the location of a light device.

FIG. 8 is a diagram for illustrating that the moving robot 100 performs on/off control of the light device 500 and if an illuminance change is not sensed, the moving robot moves to a sensing expectation area and determines the location of the light device 500. In accordance with the embodiment of FIG. 8, the control unit 140 may turn on the light device 500 of the off state and determine whether an illuminance change is sensed in an image obtained by the image acquisition unit 120.

If an illuminance change is not sensed, the control unit 140 may determine the sensing expectation area 601, that is, an area in which an illuminance change may be sensed within the driving area 600, based on map information of the driving area 600 and current location information of the main body 110. For example, if an illuminance change is not sensed, the control unit 140 may determine the sensing expectation area 601 by determining that the moving robot 100 is located in an area where an illuminance change cannot be sensed in terms of the structure of the driving area 600 and determining a location where another area of the driving area 600 may be sensed.

If the light device 500 has been on and an illuminance change is not sensed, the control unit 140 may move the main body 110 to the sensing expectation area 601. While the main body 110 moves, the control unit 140 may determine whether an illuminance change is sensed.

If an illuminance change is not sensed although the main body 110 is located in the sensing expectation area 601, the control unit 140 may determine a new sensing expectation area and move.

If the main body 110 is located in the sensing expectation area 601 and an illuminance change is sensed, the control unit 140 may determine the location of the light device 500 by moving the main body 110 in the direction in which illuminance increases or the direction in which an illuminance change increases. Illuminance increases as it becomes close to the light device 500 of an on state, and an illuminance change increases as it becomes close to the light device 500 that repeats on/off. Accordingly, the direction in which illuminance or an illuminance change increases may correspond to the direction in which the light device 500 on which on/off control is performed is located.

Figure 9:
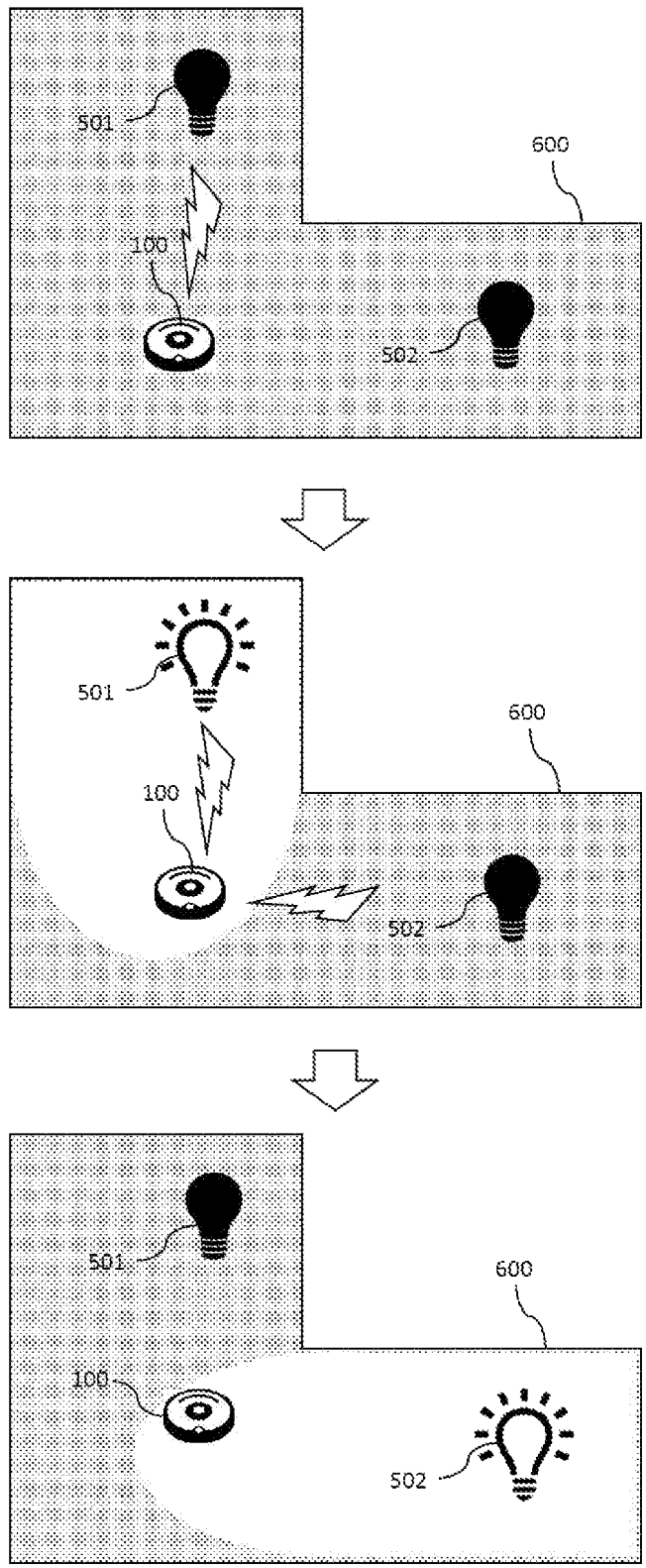
FIG. 9 is a diagram for illustrating that the moving robot determines the location of each light device by sequentially performing on/off control of a plurality of light devices.

FIG. 9 is a diagram for illustrating that the moving robot determines the location of each light device 500 by sequentially performing on/off control of the plurality of light devices 500. In accordance with the embodiment of FIG. 9, the control unit 140 may control a plurality of light devices 500 so that they are sequentially on/off.

The control unit 140 may determine the location of each of the plurality of light devices 500 by determining timing at which light is generated and the location of an object that generates the light in an acquisition image.

For example, if a first light device 501 and a second light device 502 are located in the driving area 600, the control unit 140 may control the first light device 501 and the second light device 502 so that the first light device 501 is first turned on and off and after the first light device 501 is turned off, the second light device 502 is turned on. The control unit 140 may determine the location of the first light device 501 and the second light device 502 based on timing at which light appearing in an acquisition image is generated and the location where the light is sensed.

Figure 10:
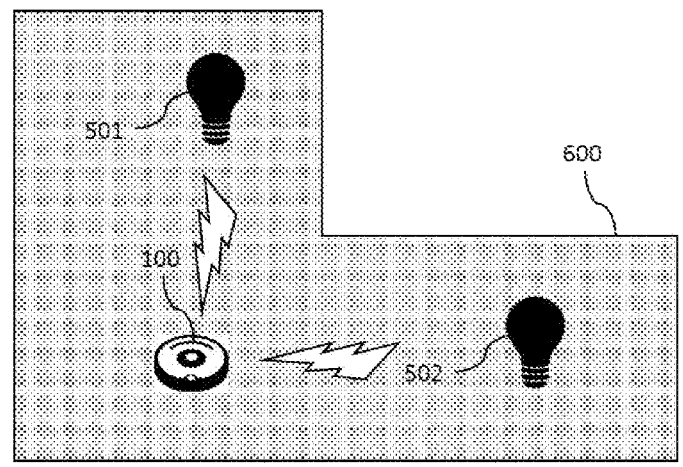
FIG. 10 is a diagram for illustrating that the moving robot determines the location of each light device by controlling a plurality of light devices so that the light devices repeats on/off in different cycles.
Figure 10:
Figure 10:
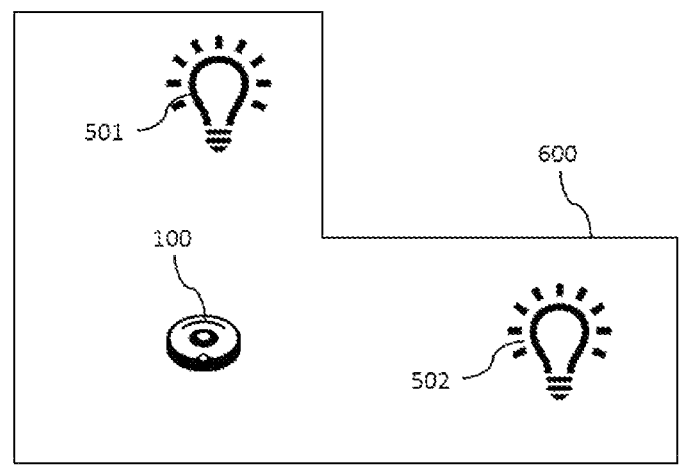
Figure 10:
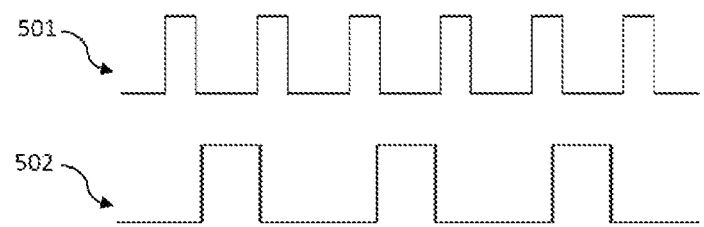

FIG. 10 is a diagram for illustrating that the moving robot 100 determines the location of each light device 500 by controlling the plurality of light devices 500 so that the light devices repeat on/off in different cycles. In accordance with the embodiment of FIG. 10, the control unit 140 may control a plurality of light devices 500 repeats on/off in different cycles. The control unit 140 may determine the location of each of the plurality of light devices 500 based on the on/off cycle of light appearing in an acquisition image.

The control unit 140 may control the plurality of light devices 500 so that they repeat on/off in different cycles, and may determine whether a detected light device 500 corresponds to which light device 500 by comparing the on/off cycle of the light device 500, detected in an acquisition image, with an on/off cycle that is being controlled.

In this case, the control unit 140 may determine that which light device 500 is disposed at which location by matching the type and location of the detected light device 500. For example, the control unit 140 may control the first light device 501 and the second light device 502 so that they flicker in different cycles.

When an illuminance change corresponding to the cycle of the first light device 501 is sensed, the control unit 140 may determine a light device 500 that generates the sensed illuminance change to be the first light device 501. The control unit 140 may determine a light device 500 in the direction in which an illuminance change corresponding to the cycle of the second light device 502 is sensed to be the second light device 502.

Figure 11:
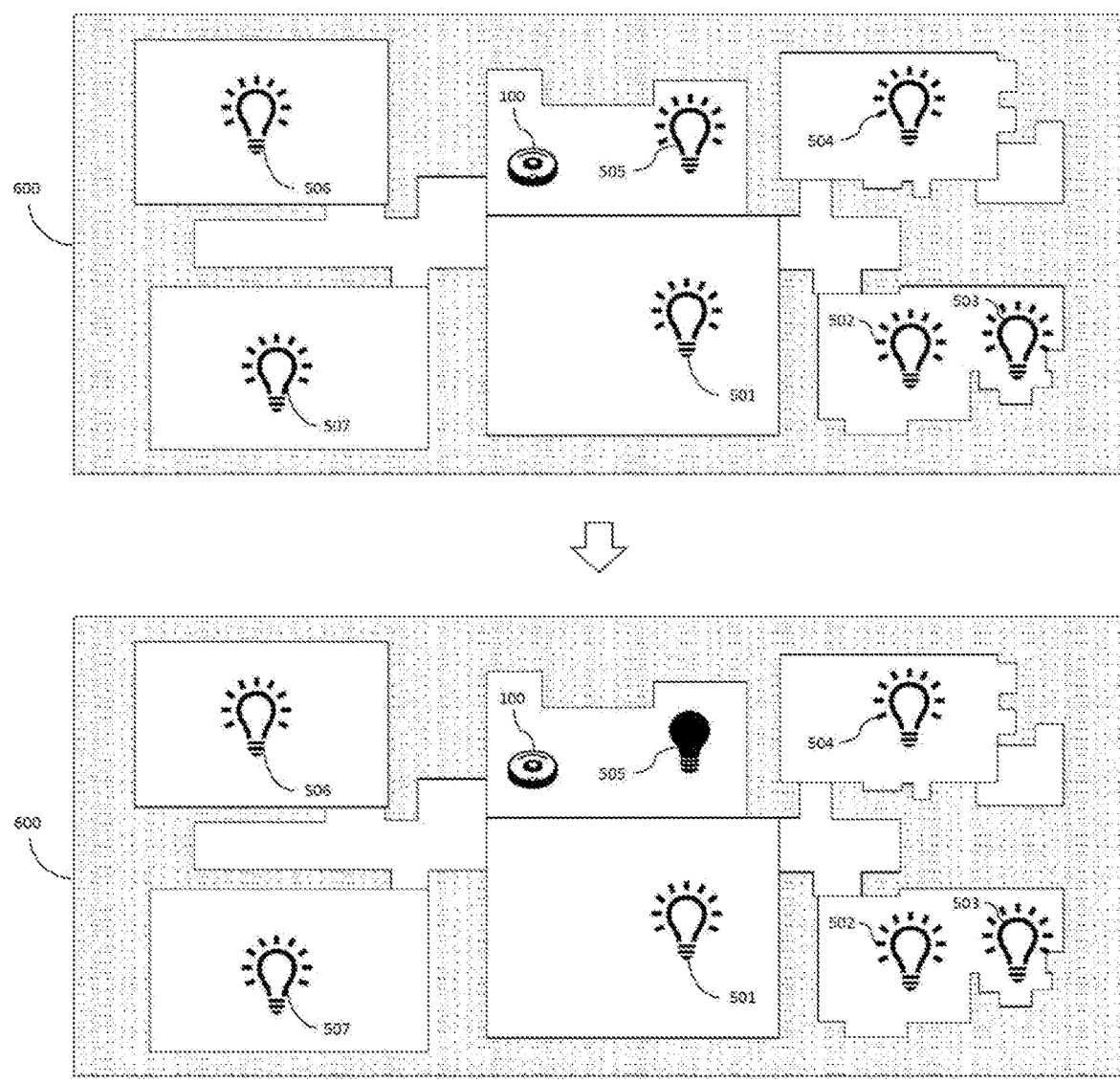
FIGS. 11 and 12 are diagrams for illustrating a method of the moving robot to determine the location of a plurality of light devices disposed in a plurality of rooms.
Figure 12:
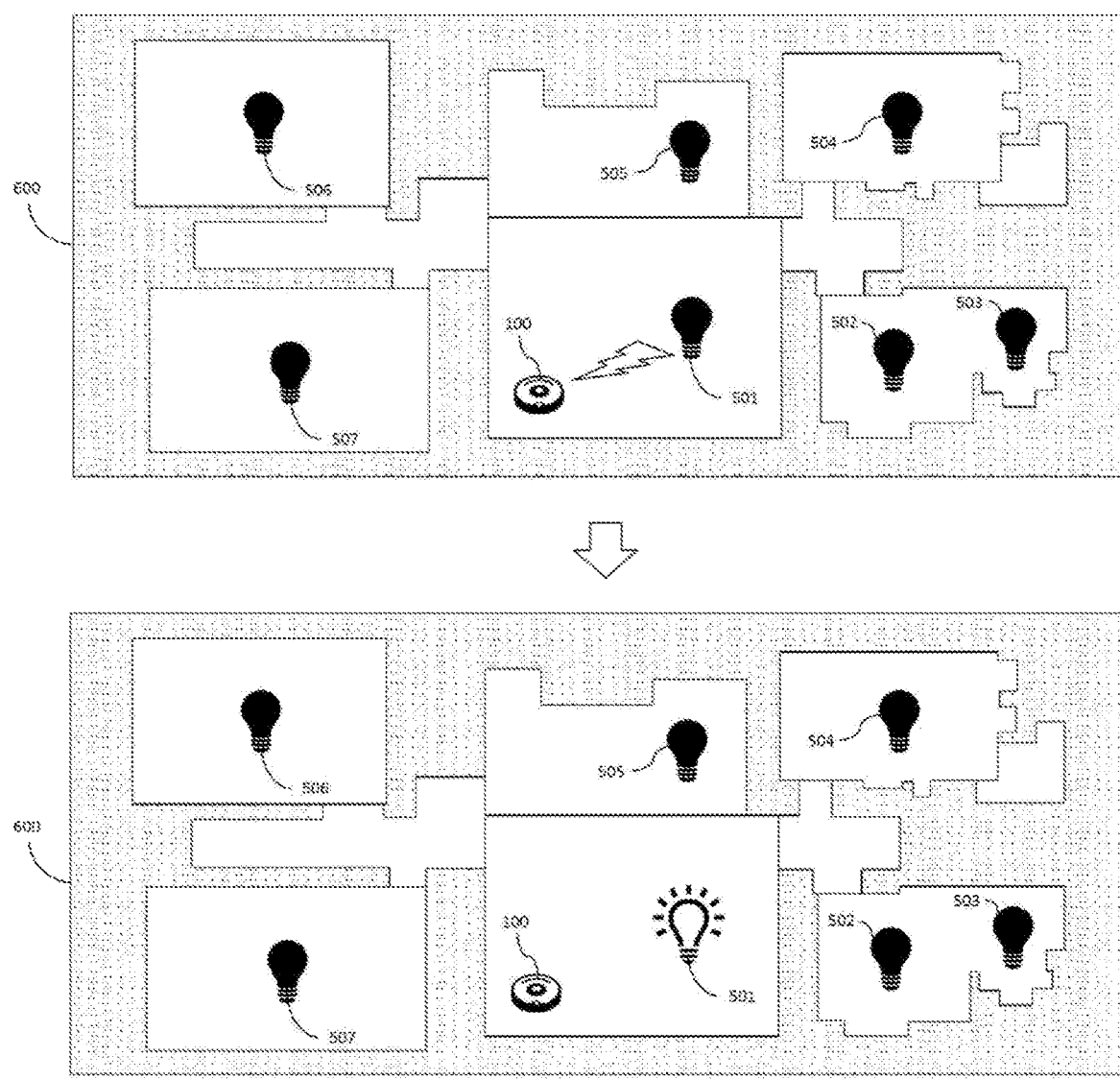

FIGS. 11 and 12 are diagrams for illustrating a method of the moving robot 100 to determine the location of a plurality of light devices 500 disposed in a plurality of rooms. In accordance with the embodiment of FIG. 11, if at least one light device 500 is located in each of a plurality of rooms, the control unit 140 may turn on all of the plurality of light devices 500, may enter one of the plurality of rooms, and may control the plurality of light devices so that they are sequentially turned on and off for a specific time.

At this time, the control unit 140 may determine that a light device 500 disposed in a room where the main body 110 is located corresponds to any one of the plurality of light devices 500 based on time when the light device 500 disposed in the room where the main body 110 is located is turned on and off.

Accordingly, the moving robot 100 can secure illuminance for determining the current location of the main body 110 and can reduce the number of times that on/off control for determining the location of the light device 500 is executed.

In accordance with the embodiment of FIG. 12, if at least one light device 500 is disposed in each of a plurality of rooms and illuminance for determining the current location of the main body 110 is sufficient, the control unit 140 may turn off all of the plurality of light devices 500, may enter one of the plurality of rooms, and may control the plurality of light devices so that they are sequentially turned on and off for a specific time.

In this case, the control unit 140 may determine that a light device 500 disposed in a room where the main body 110 is located corresponds to any one of the plurality of light devices 500 based on time when the light device 500 disposed in the room where the main body 110 is located is turned on and off. If illuminance for determining the current location of the main body 110 is sufficient, it may mean that sensed illuminance is location determination criterion illuminance or more.

The location determination criterion illuminance may be a value determined by experiments or may be data stored in the storage unit. Accordingly, the moving robot 100 can reduce the number of times that on/off control for determining the location of the light device 500 is executed.

Hereinafter, an embodiment in which the location of a light device is manually input is described. The control unit 140 may perform control so that a manual input menu for the light device 300 is output. The control unit 140 may control the output unit 180 so that it outputs the manual input menu, or may control the output unit of an external terminal communicating with the communication unit 190 outputs the manual input menu.

The manual input menu may be at least one of an image and a sound output so that a user directly inputs information about the light device 500. The information about the light device 500 may include information about the location of the light device 500. The information about the light device 500 may include at least one of product information of the light device 500, the type of light device, and information about a communication connection method.

The control unit 140 may determine the location of the light device 500 based on a user's input received in accordance with the manual input menu. The control unit 140 may receive the user's input through the input unit 137 or may receive the user's input through the input unit of an external terminal communicating with the communication unit 190.

For example, the control unit 140 may display the map of a driving area as the manual input menu through the output unit 180 or the output unit of a terminal, and may determine a location selected by a user's input within the displayed map to be the location of the light device 500. The control unit 140 may generate a light map based on the location of the light device 500 determined by the user's input.

Furthermore, if it is determined that there is no light device 500 disposed in a room where the main body 110 is located, the control unit 140 may output a manual input menu for the light device 500 to the output unit 180. Accordingly, if the location of a light device is not determined, the control unit 140 may induce a user to directly input the location of the light device. The control unit 140 may determine the location of the light device based on the user's input received through the input unit 137 in accordance with the manual input menu. If the location of a light device is not determined, it means that a connection or remote connection with the light device 500 has not been performed. The control unit 140 may obtain information necessary for a connection or remote connection with the light device 500 through the manual input menu. For example, the control unit 140 may obtain information necessary for a connection or remote connection with the light device 500 based on a user's input or information provided by a predetermined server.

Hereinafter, an embodiment in which the moving robot 100 controls the plurality of light devices 500 disposed in the driving area 600 based on a generated light map is described in detail. The control unit 140 may turn on a light device that belongs to the plurality of light devices 500 and that corresponds to the location of the main body 110 based on the light map.

The light device 500 corresponding to the location of the main body 110 may be a light device 500 capable of changing illuminance in the space where the main body 110 is located. For example, if the driving area 600 is divided into a plurality of rooms and the main body 110 is located in one of the rooms, a light device 500 in the room where the main body 110 is located is a light device 500 corresponding to the location of the main body 110.

The moving robot 100 may secure illuminance necessary to sense an obstacle present nearby or a surrounding environment by turning on the light device 500 corresponding to the location of the main body 110. The control unit 140 may turn off a light device 500 that belongs to the plurality of light devices 500 and that does not correspond to the location of the main body 110 based on the light map.

The light device 500 not corresponding to the location of the main body 110 may be a light device 500 incapable of changing illuminance in the space where the main body 110 is located. For example, if the driving area 600 is divided into a plurality of rooms and the main body 110 is located in one of the rooms, light devices 500 located in the remaining rooms other than the room where the main body 110 is located may be light devices 500 not corresponding to the location of the main body 110.

The moving robot 100 can turn off a light device 500 that is unnecessary to secure illuminance and reduce unnecessary energy consumption by turning off a light device 500 not corresponding to the location of the main body 110. An operation of the moving robot 100 to turn off the light device 500 not corresponding to the location of the main body 110 may be implemented in a power saving mode. A user may activate or deactivate the power saving mode. When the power saving mode is activated, the moving robot 100 may turn off a light device 500 not corresponding to the location of the main body 110.

If illuminance sensed by the image acquisition unit 120 is set illuminance or less, the control unit 140 may turn on a light device that belongs to the plurality of light devices 500 and that corresponds to the location of the main body 110 based on a light map. The control unit 140 may sense an object based on an image obtained by the image acquisition unit 120. The set illuminance may be the least illuminance that is necessary for the control unit 140 to sense an object. The set illuminance may be illuminance that is necessary for the control unit 140 to sense and determine a surrounding obstacle or a surrounding environment based on an image obtained by the image acquisition unit 120. The set illuminance may be a value determined by experiments and may be a value stored in the storage unit.

If illuminance in an environment around the moving robot 100 is already sufficient, it is not necessary to turn on the light device 500 so as to secure illuminance. If surrounding illuminance exceeds set illuminance, the control unit 140 does not turn on a surrounding light device 500, thereby being capable of reducing energy.

In another embodiment of the present invention, the driving area 600 may include a plurality of rooms, and at least one light device 500 may be disposed in each of the plurality of rooms. In this case, the plurality of rooms and the plurality of light devices 500 may be indicated in a light map.

The control unit 140 may turn on a light device 500 disposed in the room that the main body 110 enters based on the light map. The control unit 140 may turn on the light device 500 disposed in the room that the main body 110 enters, thereby being capable of securing illuminance necessary to sense surroundings.

The control unit 140 may turn off a light device 500 disposed in a room from which the main body 110 exits based on the light map. The control unit 140 may turn off the light device 500 disposed in the room from which the main body 110 exits, thereby being capable of securing energy.

The control unit 140 may turn on a light device 500 disposed in a room that the moving robot 100 enters and turn off a light device disposed in a room from which the moving robot 100 exits if the moving robot exits from the room that it has entered, thereby being capable of maximizing energy efficiency.

In accordance with another embodiment of the present invention, the control unit 140 may determine the location of the main body 110 based on an image obtained by the image acquisition unit 120. If it is determined that the location of the main body 110 cannot be determined because illuminance of the image is low, the control unit 140 may turn on all of a plurality of light devices 500. If the location of the light device 500 disposed in the driving area 600 is not determined, the location of the light device 500 cannot be aware. Accordingly, if it is determined that additional illuminance is necessary to determine the current location of the moving robot 100, the control unit 140 may turn on all of the light devices 500 within the driving area 600.

The least illuminance necessary to determine the location of the main body 110 may be a value that has been determined by experiments and previously stored in the storage unit. If the location of the light device 500 is unaware and current illuminance is the least illuminance or less, the control unit 140 may secure illuminance by turning on all of the light devices 500 within the driving area 600, and may then determine the current location of the moving robot 100.

The control unit 140 may determine a room that belongs to a plurality of rooms in the driving area 600 and where a light device is determined to be not present to be a reservation area, and may display a setting screen so that a user manually sets the location of a light device with respect to the reservation area. In this case, the control unit 140 may set the location of the light device, corresponding to the reservation area, based on a user input received through the input unit 137 or a mobile terminal that remotely controls the moving robot 100. The control unit 140 may determine that the light device is located at a location designated by the user.

The aforementioned embodiments of the present invention may be implemented in a recording medium on which a program has been recorded in the form of code readable by a computer. The computer-readable recording medium includes all types of recording devices in which data readable by a computer system is stored. The computer-readable recording medium may include, for example, a hard disk drive (HDD), a solid state disk (SOD), a silicon disk drive (SDD), ROM, RAM, CD-ROM, magnetic tapes, floppy disks, and optical data storages. Furthermore, the computer-readable recording medium may be implemented in the form of carrier waves (e.g., transmission through the Internet).

Furthermore, the computer may include the controller 180 of the mobile terminal. Accordingly, the detailed description should not be construed as being limited from all aspects, but should be considered to be illustrative. The range of right of the present invention should be determined by reasonable analysis of the attached claims, and all changes within the equivalent scope of the present invention are included in the range of right of the present invention.

The embodiments of the present invention have one or more aspects described below. First, there are aspects in that the moving robot can autonomously determine the deployment of a light device within a driving area and generate a light map in which the deployment of a light device is indicated.

Second, there is an aspect in that the moving robot can secure necessary illuminance by controlling a light device whose location has been determined when the moving robot determines a current location or detects an object based on an acquisition image. Third, there is an aspect in that unnecessary energy consumption can be prevented because the moving robot turns on only a light device that is of help to determine a current location and turns off an unnecessary light device.

Aspects of the present invention are not limited to the aforementioned effects, and other effects not described above may be evidently understood by those skilled in the art from the following description.

Although preferred embodiments of the present invention are described above with reference to the accompanying drawings, it is understood that those skilled in the art may embody the technical configuration in other specific forms without changing the technical spirits and essential features of the present invention. Therefore, it should be understood that the embodiments described above are exemplary and not restrictive in all aspects, and the scope of the present invention is defined by the appended claims rather than the above specific descriptions. It should be interpreted that all the changed and modified forms derived from the meaning, scope and equivalent concepts of the claims are included in the scope of the present invention.

An aspect of the present invention is to provide a moving robot capable of determining the location of a light device in a driving area. Furthermore, other aspect of the present invention is to provide a moving robot capable of securing necessary illuminance in order to determine the current location or detect an object through a captured image by controlling a light device. Furthermore, other aspect of the present invention is to provide a moving robot capable of preventing unnecessary energy consumption by controlling off of an unnecessary light device.

Aspects of the present invention are not limited to the aforementioned objects, and other objects not described above may be evidently understood by those skilled in the art from the following description.

In order to achieve the first and second objects, a moving robot according to an exemplary embodiment of the present invention may include a control unit controlling on/off of a light device through a communication unit and determining the location of a light device while moving a main body to a location where illuminance is changed based on an image obtained by an image acquisition unit.

Furthermore, a moving robot according to an embodiment of the present invention may include a control unit turning on a light device that belongs to a plurality of light devices and that corresponds to the location of a main body based on a light map when illuminance sensed through an image acquisition unit is set illuminance or less.

Furthermore, a moving robot according to an embodiment of the present invention may include a control unit turning on only a light device corresponding to the location of a main body and turning off a light device not corresponding to the location of the main body. Details of other embodiments are included in the detailed description and the drawings.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A moving robot comprising:
    a main body;
    a motor the provides a driving force to move the main body through a driving area;
    an image sensor that obtains an image of a region around the main body;
    a communication interface that communicates with at least one light device provided in the driving area; and
    a controller that:
        controls the motor to move the main body,
        controls the light device through the communication interface to selectively switch on or off, and
        determines a location of the light device based on an illuminance change sensed in the image obtained by the image sensor,
        wherein the controller determines the location of the light device while controlling the motor to move the main body in at least one of a first direction in which the sensed illuminance change in the image increases or a second direction in which a sensed illuminance in the image increases.

2. The moving robot of claim 1, wherein the controller causes the light device to at least one of:
    switch off during a first duration,
    switch on during a second duration, or
    repeatedly switch on and off at least once during a third duration.

3. The moving robot of claim 1, wherein the controller causes the light device to selectively switch on or off during a first time period, and
    wherein the controller further:
        activates the motor to move the main body to another location when the illuminance change is not sensed in the image during the first time period,
        controls, after the main body is moved to the other location, the light device through the communication interface to cause the light device to selectively switch on or off during a second time period, and
        determines whether an illuminance change is sensed in another image obtained by the image sensor during the second time period.

4. The moving robot of claim 1, wherein when the light device is not provided in a room where the main body is located, the controller outputs a manual input menu for the light device, and determines a location of a light device based on a user's input received via the manual input menu.

5. The moving robot of claim 1, wherein:
    when the illuminance change is sensed while the light device is switched on, the controller activates the motor to move the main body in the second direction in which illuminance increases,
    when the illuminance change is sensed while the light device is repeatedly switched on and off, the controller activates the motor to move the main body in the first direction in which the illuminance change increases, and
    when the illuminance change is sensed while the light device is switched off, the controller directs the light device to repeatedly switch on and off and activates the motor to move the main body in a third direction in which the illuminance change increases while the light device to repeatedly switches on and off.

6. The moving robot of claim 1, wherein
    a plurality of light devices are provided in the driving area, and
    the controller controls the plurality of light devices to repeatedly switch on and off in different cycles, and determines respective locations of the plurality of light devices based on an on/off cycle of light sensed in the image.

7. The moving robot of claim 1, wherein
    a plurality of light devices are provided in the driving area, and
    the controller controls the plurality of light devices to be sequentially turned on and off, and determines respective locations of the plurality of light devices based on a light-emitting timing sensed in the image.

8. The moving robot of claim 1, wherein
    a plurality of light devices are provided in the driving area, and
    the controller controls one of the plurality of light devices to selectively switch on or off, and determines a location of the controlled one of the plurality of light device based on the illuminance change sensed in the image.

9. The moving robot of claim 8, wherein the drive area includes a plurality of rooms,
    the lighting devices are located in the rooms, and
    the controller controls the light devices so that the light devices are sequentially turned on and off, and determines one of the light devices generating an illuminance change in one of the rooms where the main body is located.

10. The moving robot of claim 9, wherein the controller determines that, when switching one of the light devices does not generate an illuminance change in the room where the main body is located, the one of the light devices is provided in another one of the rooms that differs from the room where the main body is located.

11. The moving robot of claim 9, wherein when two or more of the light devices are determined to be provided in the room where the main body is located, the controller controls the two or more of the light devices in the room to repeatedly switch on and off in different cycles or to sequentially turn on or off, and determines respective locations of the two or more of the light devices within in the room based on illuminance changes sensed in the image.

12. A moving robot, comprising:
a main body;
a motor that provides a driving force to move the main body through a driving area;
a sensor that detects an illumination level outside of the main body;
a communication interface that communicates with at least one light device provided in the driving area; and
a controller that:
selectively activates the motor to move the main body moves within the driving area,
controls the light device through the communication interface,
outputs a manual input menu for the light device, and
determines a location of the light device based on a user's input received by the manual input menu,
wherein the controller determines the location of the light device further based on the illumination level detected by the sensor, and
wherein the controller determines the location of the light device while activating the motor to move the main body in at least one of a first direction in which a change of the illumination level increases or a second direction in which the illumination level increases.

13. The moving robot of claim 12, wherein a plurality of light devices are present in the driving area, and if a location of at least one of the plurality of light devices is determined, the controller presents a map identifying the respective determined locations of the at least one light devices.

14. The moving robot of claim 13, wherein the controller further turns off one of the light devices that is not provided in a location of the main body.

15. The moving robot of claim 13, wherein the controller identifies, in the map, a location of the main body and turns on one of the light devices associated with the location of the main body.

16. The moving robot of claim 13, wherein when sensed illuminance is a set illuminance or less, the controller turns on one of the light devices provided in a location associated with the main body based on the light map.

17. The moving robot of claim 13, wherein the controller further determines, based on the map, when the main body enters a first room and turns on one of the light devices provided in the first room.

18. The moving robot of claim 17, wherein the controller further determines, based on the map, when the main body exits a second room and turns off another one of the light devices provided in the second room.

* * * * *